No. 885,501. PATENTED APR. 21, 1908.
E. MERRIFIELD & W. A. PEEK.
ENVELOP SEAL OR FASTENER.
APPLICATION FILED OCT. 7, 1907.
2 SHEETS—SHEET 1.
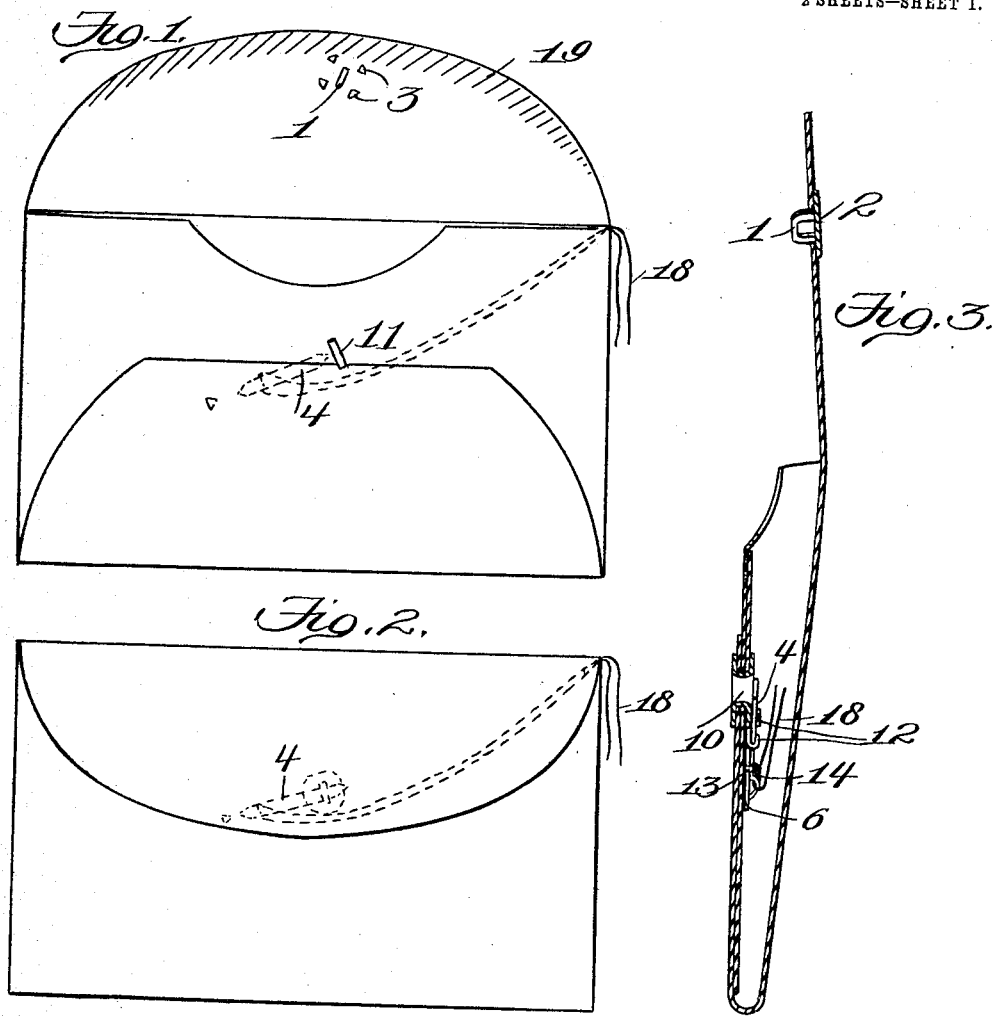

No. 885,501.   
PATENTED APR. 21, 1908.

E. MERRIFIELD & W. A. PEEK.
ENVELOP SEAL OR FASTENER.
APPLICATION FILED OCT. 7, 1907.

2 SHEETS—SHEET 2.

Witnesses:

Inventors
Enoch Merrifield
William A. Peek
By James L. Norris
Atty.

UNITED STATES PATENT OFFICE.

ENOCH MERRIFIELD AND WILLIAM A. PEEK, OF MARYSVILLE, MONTANA; SAID MERRIFIELD ASSIGNOR TO SAID PEEK.

ENVELOP SEAL OR FASTENER.

No. 885,501.　　　Specification of Letters Patent.　　Patented April 21, 1908.

Application filed October 7, 1907. Serial No. 396,274.

*To all whom it may concern:*

Be it known that we, ENOCH MERRIFIELD and WILLIAM A. PEEK, citizens of the United States, residing at Marysville, in the county of Lewis and Clark and State of Montana, have invented new and useful Improvements in Envelop Seals or Fasteners, of which the following is a specification.

Our present invention relates to improvements in devices for sealing and fastening envelop flaps, and it has for its object to provide a simple and efficient device of this character that is capable of being applied universally to envelops of various kinds, and which in practice may be readily manipulated to lock the envelop flap in a manner that will not only serve or assist in the fastening of the envelop, but will also prevent opening thereof without mutilation that will lead to detection.

Further objects of the invention are to provide a device of this character that is capable of being manufactuerd cheaply and can be readily applied to the envelop.

To these and other ends, the invention consists in certain improvements, and combinations and arrangements of parts, all as will be hereinafter more fully described, the novel features being pointed out particularly in the claims at the end of the specification.

Figure 6:
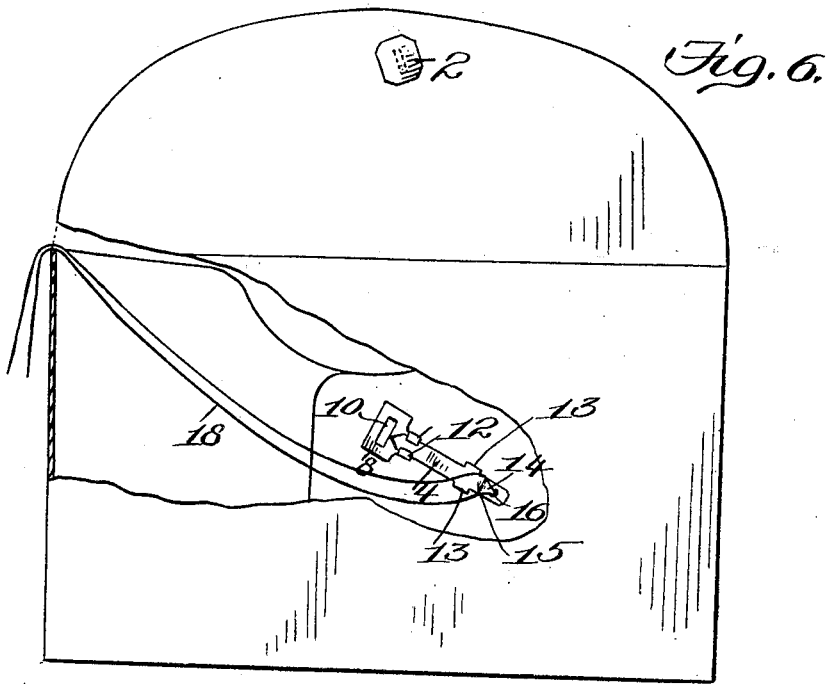
Figure 7:
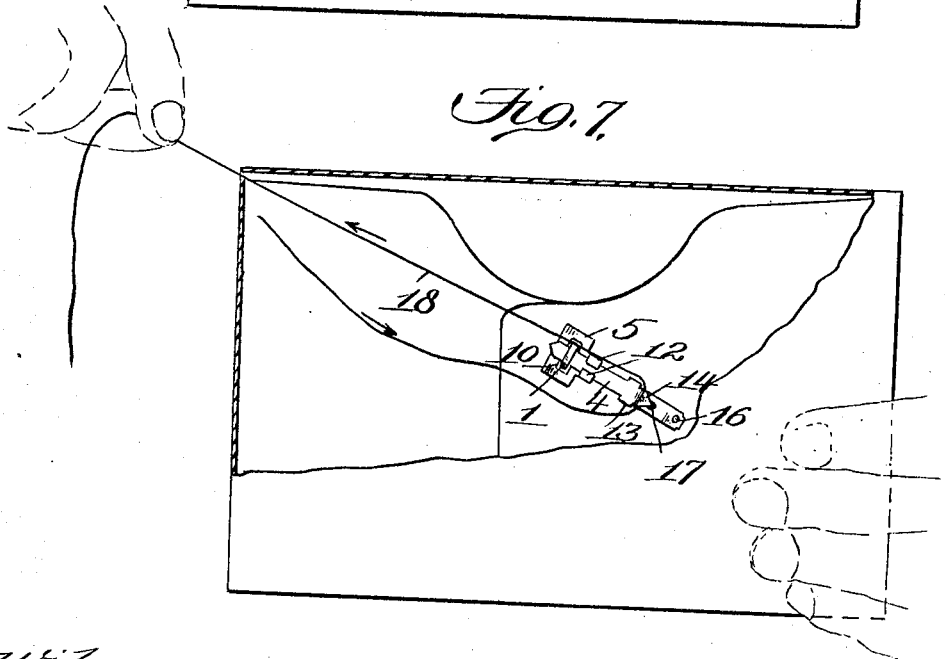

In the accompanying drawings—Figure 1 shows an envelop of ordinary form provided with a seal or fastener constructed in accordance with our present invention, the parts being shown in unfastened position; Fig. 2 is a view similar to Fig. 1, showing the parts fastened; Fig. 3 represents a transverse section of Fig. 1; Fig. 4 is a sectional view showing the parts in fastened position; Fig. 5 is a perspective view of one of the fastening members detached from the envelop; and Figs. 6 and 7 are diagrammatic views illustrating the manner of manipulating the seal or fastener to lock it.

Similar parts in the several views are designated by the same numerals of reference.

Seals or fasteners constructed in accordance with our present invention are, as previously stated, capable of use generally in connection with envelops and similar devices wherein it is desirable to secure the same in closed position and to prevent unauthorized access thereto, the devices being so constructed and applied relatively to the envelop or container that tampering therewith for the purpose of unfastening the same will cause the material of the envelop or container to be so mutilated as to insure detection.

In the present embodiment we have shown what we now consider to be the best form of our invention, the device shown embodying a pair of fastening members arranged respectively on the body and flap of the envelop and adapted to coöperate when the latter is folded into closed position. One of the members embodies an eye 1 which may be arranged on either part of the envelop, it being preferable to secure it to the flap thereof by means of an attaching plate 2, the latter being provided with suitable means of attachment. This plate in the present instance is arranged on the outer surface of the flap, that is to say, the surface thereof that would be outermost when the flap is closed, the eye thereon projecting through an opening in the flap, and the attaching flap is secured thereto by means of a suitable number of prongs or projections 3 which are bent laterally from the peripheral edges of the plate and are extended through the material of the flap and finally clenched against its inner surface. When the flap is in closed position, these clenched prongs are wholly covered or protected so that they cannot be bent to permit the removal of the attaching plate. The coöperating member in this instance is secured to the body of the envelop, and it comprises in the present instance a reciprocating bolt 4 which is capable of being moved into locking engagement with the coöperating eye and flap. This bolt in the present instance is attached to the envelop by means of a guide 5 which may be of any suitable form and provided with means for attaching it to the envelop, the guide shown in the present instance embodying an arm 6 which is adapted to engage at the inner side of the envelop and is provided at one end with a pointed tongue 7 which is adapted to be bent laterally and extended outwardly through the material of the envelop and finally clenched at its outer side, the opposite end of the arm being preferably provided with a loop 8 adapted to surround the eye on the flap thereof when the latter is folded into closed position, and this loop portion is provided with a pair of tongues 9 which also are adapted to be extended through the material in the envelop end clenched at the outer side thereof. In the present instance the tongues 9 are punched from the body of the loop portion of the guide forming an epening 10 therein to receive the coöperating eye, and the fastening tongues are extended through an opening 11 which is formed in the body of the envelop to admit the eye. The fastening tongues 7 and 9 of the guide are preferably so arranged on the body of the envelop that they will be concealed by the flap thereof when the latter is in closed position as shown in Fig. 2, and therefore, they are so protected that it is impossible to tamper with them in an effort to open the envelop. The locking bolt 4 is guided in its movements by a pair of fingers 12 which are struck up from the longitudinal edges of the guide and doubled parallel to the inner surface thereof so as to embrace and confine the bolt, although it will permit a reciprocating movement thereon, and the bolt is provided with a similar pair of fingers 13 which embrace the longitudinal edges of the arm on the guide and serve to permit reciprocating movement only to the bolt.

The bolt is preferably provided with means for retaining it in locked and unlocked positions so as to prevent accidental fastening thereof and to retain it in locked position, the bolt in the present instance being provided with a pointed projection 14 at one end which is off-set laterally of the bolt to form a shoulder 15, and it extends obliquely relatively to the plane of the guide, the latter being provided with a pair of longitudinally spaced apertures 16 and 17 into which the pointed projection is adapted to engage, the projection engaging the aperture 16 when the bolt is in unfastened position, and as the bolt moves into fastened position, the projection will automatically engage in the aperture 17 by reason of the flexible or resilient action of the material composing the bolt.

Any suitable means may be employed for effecting the fastening of the seal, a thread or string 18 being preferably employed which is extended through the opening formed between the retaining projection 14 and the guide, and then doubled, a tension on both ends of the string serving to draw the bolt into locked position and the string or thread may be disengaged by releasing one end thereof and drawing on its other end.

Envelops provided with seals or fasteners constructed in accordance with the present invention, are preferably supplied with the string or thread applied thereto as shown in Figs. 1 and 6, the locking bolt normally resting in unfastened position, the pointed projection thereof engaging the aperture 16 and the guide to prevent accidental fastening thereof, and the flap of the envelop is preferably provided with a glued edge 19 so that it may be firmly pasted against the back of the envelop, and thereby prevent tearing of the flap as well as to insure a good closure therefor, although it must be understood, of course, that the seal or fastener alone may serve to retain the flap in closed position, and in those cases it is unnecessary to glue the flap.

In practice, the envelop is sealed by folding the flap thereof into closed position as usual, the glued portion therefor being previously moistened in those cases where the glued flap is employed. The eye, of course, registers with and passes through the opening 11 from the body of the envelop and occupies a position in alinement with the locking bolt. As the flap is folded into closed position the operating string 18 is so arranged as to extend through one corner of the envelop, and by drawing on both ends of the string while the latter engages the shoulder 15 of the locking bolt, the latter will be moved into locked position, that is to say, it will pass through the eye and thereby prevent opening of the flap, the projection on the bolt engaging the aperture 17 in the guide and thereby preventing unlocking movement of the bolt. The operating string is preferably removed after sealing the envelop, and this may be accomplished, as previously stated, by drawing on one of the ends thereof.

Envelop seals or fasteners constructed in accordance with the present invention are capable of being manufactured cheaply as they may be stamped by the use of dies from sheet brass, aluminum, or other suitable material of appropriate gage, and they may be readily applied to the envelop, and in practice they serve to effectually seal the envelop so that unauthorized opening thereof cannot be accomplished without mutilating the paper or other material composing the envelop, and to do this would lead to detection.

What we claim is:—

1. An envelop seal or fastener involving an envelop, a longitudinally reciprocable securing part lockable from the interior of the envelop, and having means for detachably connecting an operating device thereto.

2. An envelop seal or fastener involving an envelop, a securing part accessible for operation from the interior of the envelop, and a detachable device operable from the exterior of the envelop for actuating said securing part.

3. An envelop seal or fastener embodying an envelop, a reciprocable securing part mounted within and accessible from the interior only of the envelop, and provided with means for attaching an actuating device thereto.

4. An envelop seal or fastener involving an envelop, a movable securing part mounted within and accessible from the interior only of the envelop, and a detachable device operable from the exterior of the envelop for effecting the locking of the said part.

5. An envelop seal or fastener involving an envelop, a movable securing part accessible from the interior of the envelop only, and a string detachably connected to the said part for effecting operation thereof from the exterior of the envelop.

6. A device of the character described, embodying an envelop, a pair of coöperating members adapted to be attached, respectively, to the body and flap of the envelop, one of the members having a slidable locking part guided to move toward one of the open corners of the envelop and slidable into locking engagement with the other member by the movement of an operating device extending through the said corner of the envelop.

7. A device of the character described embodying an envelop, a pair of locking members adapted to be secured, respectively, to the body and flap of the envelop, one of the members involving an eye, and the other member having a part movable toward one of the open corners of the envelop and adapted to coöperate with the said eye, and an operating device adapted to extend through said corner of the envelop and actuate said part.

8. A device of the character described embodying an envelop, a pair of coöperating members adapted to be attached, respectively, to the body and the flap of the envelop, one of the members having an eye, and the other member having a reciprocable locking bolt arranged within the envelop and slidable into locking engagement with the said eye.

9. A device of the character described involving an envelop, a reciprocable securing part having means for yieldingly retaining it in an unfastened position and for locking it in fastened position.

10. A device of the character described embodying an envelop, a pair of coöperating members, one of the latter having an eye, and the other member having a slidable locking part adapted to occupy locked and unlocked positions relatively to the eye, and a pointed locking projection inaccessible from the exterior of the envelop for retaining the said part in locked position.

11. A device of the character described involving an envelop, a movable securing part mounted within the envelop and having a string receiving portion, and a string adapted to extend through one of the corners of the envelop and detachably engaging the said part for effecting the locking thereof from the exterior of the envelop.

12. A device of the character described embodying an envelop, a pair of coöperating members, one of the latter having an eye, and the other member comprising a guide adapted to be secured to the envelop, and a reciprocable securing part mounted on the guide and adapted to coöperate with the said eye, said part being provided with means for detachably connecting an actuating device thereto.

13. A device of the character described embodying an envelop, a pair of coöperating members adapted to be attached, respectively, to the body and flap of the envelop, one of the members having an eye, and the other member comprising a relatively fixed guide, a securing part slidable thereon and adapted to coöperate with the eye, and means for yieldably retaining the slidable part in unfastened position.

14. A device of the character described embodying an envelop, a pair of coöperating members adapted to be attached, respectively, to the body and flap of the envelop, one of the members embodying an eye, and the other member comprising a guide having a loop portion to receive the eye and provided with longitudinally spaced apertures, and a locking bolt slidable on the guide and having a portion adapted to coöperate with the said eye, and provided with a resilient projection to coöperate with the said apertures.

In testimony whereof we have hereunto set our hands in presence of two subscribing witnesses.

ENOCH MERRIFIELD.
WILLIAM A. PEEK.

Witnesses:
GEO. W. PADBURY,
O. M. MATTHEWS.